(12) United States Patent
Tussing (10) Patent No.: US 9,374,437 B2
(45) Date of Patent: Jun. 21, 2016

(54) SCHEMA VALIDATION PROXY

(75) Inventor: Sebastian Tussing, Heilelberg (DE)

(73) Assignee: SAP SE, Walldorf (DE)

(*) Notice: Subject to any disclaimer, the term of this patent is extended or adjusted under 35 U.S.C. 154(b) by 260 days.

(21) Appl. No.: 12/981,906

(22) Filed: Dec. 30, 2010

(65) Prior Publication Data

US 2012/0173658 A1 Jul. 5, 2012

(51) Int. Cl.
*G06F 15/16* (2006.01)
*H04L 29/08* (2006.01)

(52) U.S. Cl.
CPC ............ *H04L 67/2819* (2013.01); *H04L 67/16* (2013.01)

(58) Field of Classification Search
CPC ...... G06F 15/16; H04L 67/2819; H04L 67/16
USPC .................. 709/230, 231, 232, 217, 219, 203
See application file for complete search history.

(56) References Cited

U.S. PATENT DOCUMENTS

| | | | | |
|---|---|---|---|---|
| 7,117,227 | B2 * | 10/2006 | Call ............................... | 709/219 |
| 7,146,422 | B1 * | 12/2006 | Marlatt et al. ................. | 709/227 |
| 7,437,550 | B2 * | 10/2008 | Savage et al. .................. | 713/156 |
| 7,613,815 | B1 * | 11/2009 | Prakash et al. ................. | 709/230 |
| 7,761,703 | B2 * | 7/2010 | Little et al. ..................... | 713/156 |
| 7,831,693 | B2 * | 11/2010 | Lai ................................ | 709/220 |
| 8,510,717 | B2 * | 8/2013 | Georgieva ................. | G06F 8/60 717/124 |
| 2002/0120685 | A1 * | 8/2002 | Srivastava et al. ............ | 709/203 |
| 2005/0198154 | A1 * | 9/2005 | Xie et al. ....................... | 709/206 |
| 2006/0168229 | A1 * | 7/2006 | Shim et al. .................... | 709/226 |
| 2006/0265689 | A1 * | 11/2006 | Kuznetsov et al. ........... | 717/117 |
| 2007/0005786 | A1 * | 1/2007 | Kumar et al. .................. | 709/230 |

OTHER PUBLICATIONS

"U.S. Appl. No. 12/981,906 , Response filed Jan. 31, 2013 to Non Final Office Action mailed Oct. 2, 2012", 13 pgs.

* cited by examiner

*Primary Examiner* — Viet Vu
(74) *Attorney, Agent, or Firm* — Schwegman Lundberg & Woessner, P.A.

(57) ABSTRACT

Systems and methods to provide a schema validation proxy to capture and validate messages against their schemas are discussed. The messages are part of web services being called from a client system at a server system. In example embodiments, a request message is received from a client system at a proxy system. Upon receipt of the request message, an automatic download of a schema definition file is triggered. The request message is validated against one or more schemas from the downloaded schema definition file. The request message is forwarded to the server system and the proxy system waits for the response. The corresponding response message is received by the proxy system and is validated against its schema. One or more log files are created to record results of the validating. The log files include a consolidated log file providing an overview of the results during a session.

18 Claims, 7 Drawing Sheets

SCHEMA VALIDATION PROXY

FIELD

The present disclosure relates generally to data processing, and in a specific example embodiment, to a schema validation proxy.

BACKGROUND

Conventionally, messages sent via web services follow open standards like simple object access protocol (SOAP) and Web Services Description Language (WSDL), which are based on extensible markup language (XML). A WSDL file comprises descriptions of how messages are structured. Typically, the structure is based on one or more XML schemas for each message. Thus, the WSDL file and specifically, the schema, defines a required syntax for each message. However, the system that generates the messages does not necessarily verify whether the message is syntactically correct (e.g., the message has a syntax defined by one or more schemas). Furthermore, conventional systems, which provide validation of messages according to their schemas, may require manual upload or triggering of uploads of these schemas.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Systems and methods for providing a schema validation proxy are discussed. In example embodiments, a request message is received from a client system at a proxy system. The proxy system may be hosted on a device separate from the client system. Upon receipt of the request message, an automatic download of a schema definition file (e.g., a WSDL file) is triggered. The location of the schema definition file is determined by a services discovery file (e.g., a web services inspection language (WSIL) file) based on a configuration file, which may to be setup by a user, specific for each server system. Once the schema definition file is retrieved, one or more schemas are automatically extracted. The request message is validated against the one or more schemas from the downloaded scheme definition file. One or more message log files are created or updated to record results of the validating. The message log files include a consolidated log file providing an overview of the results during and after a session.

In an example embodiment, a user does not need to manually download or manually trigger the download of schema definition files. Additionally, because message log files are consolidated, users can easily access results of the schema validation process at a desired level of detail for a session (e.g., test run). Accordingly, one or more of the methodologies discussed herein may, for example, obviate a need for searching for and reviewing of various schema validation results in order to find a desired result, which may have the technical effect of conserving computing resources used by one or more devices within the system. Examples of such computing resources include, without limitation, processor cycles, network traffic, memory usage, storage space, and power consumption. In some instances, human resources may be conserved by avoiding manual analysis of the syntax of messages, easing error analysis through the various log files concerning a set of services.

Figure 1:
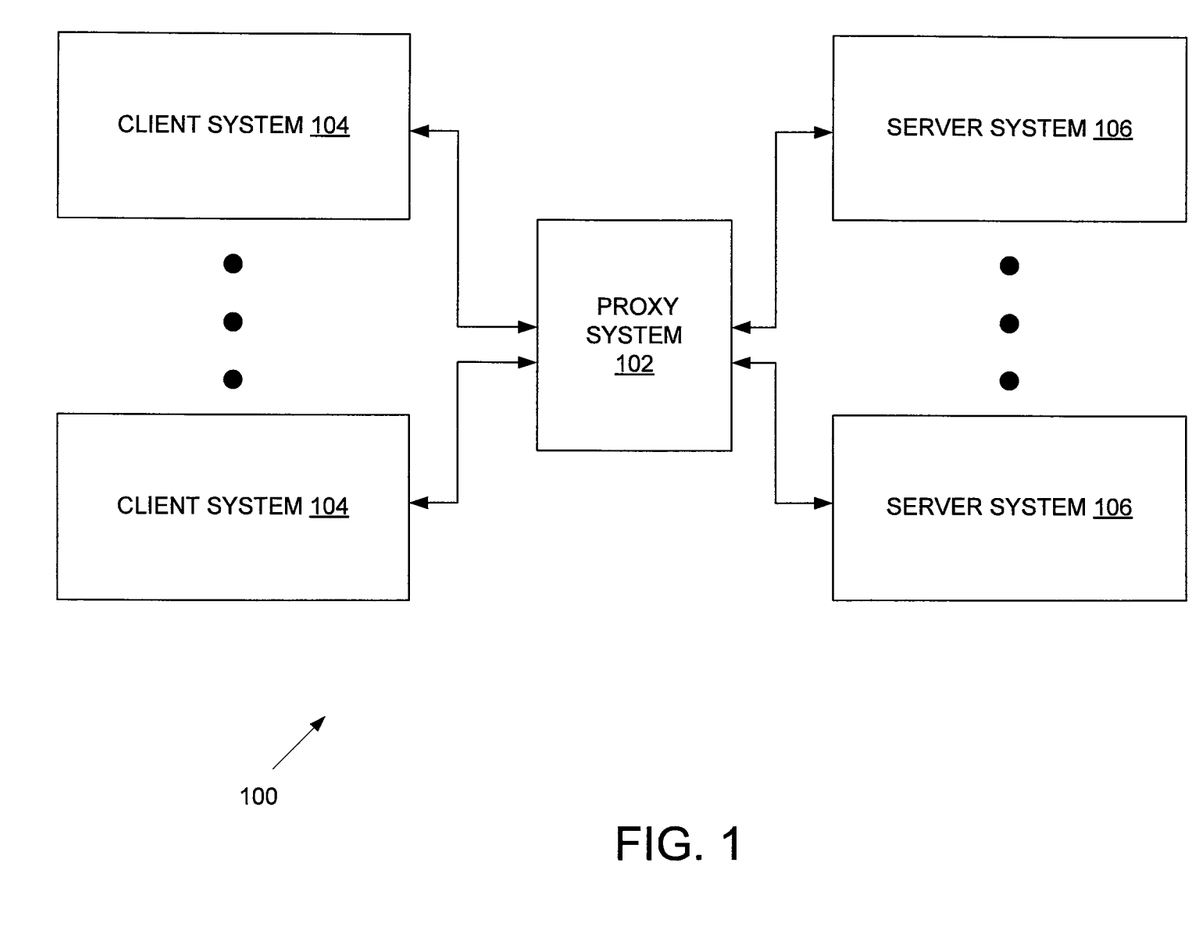
FIG. 1 is a block diagram illustrating an example of an environment in which example embodiments may be deployed.

With reference to FIG. 1, an embodiment of an environment 100, in which example embodiments may be deployed, is shown. A proxy system 102 is communicatively coupled between one or more client systems 104 and one or more server systems 106. It is noted that any number of client systems 104 and server systems 106 may utilize the proxy system 102.

In example embodiments, a request message (e.g., web service call) is created using test or productive data by the client system 104 and sent to the server system 106. In one embodiment, a request message is sent via SOAP.

The proxy system 102 receives the request message, performs schema validation on the request message, and forwards the request message to the server system 106. In example embodiments, the request message is routed to the proxy system 102 based on a designation within a hypertext transfer protocol (HTTP) destination field of a port and URI of a proxy, specifying an address of the proxy system 102.

Schema validation may be performed on both synchronous and asynchronous services. The process of schema validation (as will be discussed in more detail below) for the asynchronous services is similar to that for synchronous services except that the response message forwarded to the client system 104 does not contain the semantic response corresponding to the request. Instead the original server system issues another request to the original client system, the request containing the semantic response.

Once received, the proxy system 102 automatically performs the schema validation of the request message. Because the foundation for reliable message processing is a correct syntax, the proxy system 102 uses a schema definition file (e.g., an XML schema file) that defines the syntax for the request message to verify whether the message is syntactically correct. In other words, the request message is validated against their corresponding schemas in order to check whether the request message is syntactically correct. The proxy system 102 further creates a consolidated log file that logs results of the schema validation. The proxy system 102 is discussed in more detail in connection with FIG. 2.

The server system 106 receives the request message and perceives the request message as coming directly from the client system 104. The server system 106 processes the request message and in case of a synchronous web service call, the server system 106 generates a response message and sends the response message back to the client system 104 via the proxy system 102. In example embodiments, the proxy system 102 receives the response message and also performs a schema validation using the schema or schemas retrieved before performing the schema validation of the request message. Then the proxy system 102 updates the logs and forwards the response message to the client system 104.

Figure 2:
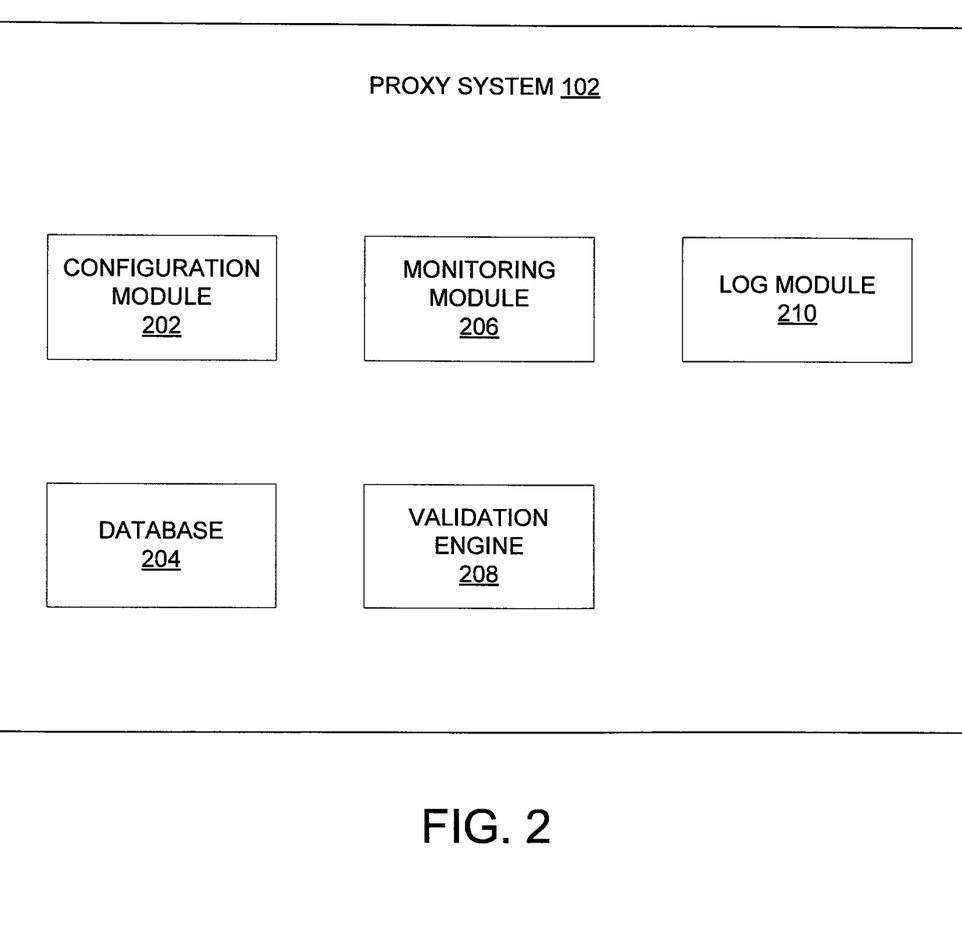
FIG. 2 is a block diagram of an example proxy system.

Referring now to FIG. 2, a detailed block diagram of the proxy system 102 is shown. In example embodiments, the proxy system 102 is embodied within a server that is independent of the client system 104 and the server system 106. The proxy system 102 captures messages (e.g., request messages and response messages) routed through the proxy system 102 and performs schema validation on the messages. To accomplish this, the proxy system 102 comprises a configuration module 202, a database or set of files 204 (e.g., in a file system), a monitoring module 206, a validation engine 208, and a log module 210 communicatively coupled together. In example embodiments, the database or set of files 204 may comprise or be coupled to a data storage device.

The configuration module 202 accesses a configuration file stored in the database or set of files 204. Because the proxy system 102 may operate with several client and server systems 104 and 106, a configuration for each server system 106 is maintained. The configuration file provides information specific to each server system 106 including, for example, a location for a service discovery file (e.g., WSIL file), a predetermined time-out threshold for a session, a setting whether response messages will be enhanced with information concerning the schema validation result, and instructions on how to name log files. It is noted that a server system in context of the schema validation proxy does not necessarily have to be a physical server, but a logical one. In example embodiments, each server system is related to one service discovery file (e.g., a WSIL file) and vice versa.

The service discovery file (e.g., WSIL file) is retrieved upon starting or initialization of a session by the configuration module 202. In one embodiment, the service discovery file may be located within the server system 106. Alternatively, the service discovery file may be located anywhere. The service discovery file publishes a list of services which may be consumed and locations for calling the services. The service discovery file also references web service definition files (e.g., web service definition language (WSDL) files) which contain schema definition files used for validation. In one embodiment, the schema is an XML schema. It is noted that while a WSIL file is discussed, any form of a service discovery file may be used.

The monitoring module 206 monitors for request messages. When a request message is received, the monitoring module 206 triggers the validation engine 208 to automatically download, from the server system 106, the most current schema definition file for the web service where the request message refers to.

Furthermore, if the monitoring module 206 does not receive a request message after a predetermined time-out period threshold (e.g., 30 minutes), the monitoring module 206 may trigger reinitialization of a session. The reinitialization of a session may cause the service discovery file to be retrieved again as well as the creation of new result log files related to a session.

The validation engine 208 performs the schema validation at the proxy system 102. The validation engine 208 will be discussed in more detail in connection with FIG. 3.

The log module 210 creates and maintains log files recording results of validation processes performed at the proxy system 102. In example embodiments, the log files may be session-based and may comprise a message log file that records schema validation results for each individual message; a result log file that provides a consolidated overview of a session (e.g., one or more related request messages for a test run, or a project); optionally an all messages log file that records all messages independent from the schema validation; and a program log file which may be used for debugging purposes or program flow analysis. Alternative log files may be contemplated depending on needs determined by a system administrator.

For example, during a session, a test run may be performed whereby a service is called several times with different kinds of data (e.g., different scenarios such as a sales order with 10 line items, no line items, and 100 line items) or different services may be called to test different scenarios on different systems. For a test run (e.g., related to a project), a user may desire a consolidated overview of the results (e.g., from the result log file) in order to determine how many errors exist, where the errors occur, and which services are affected. The same user or different users may want a more detailed view of the results, such as viewing the individual request and response messages (e.g., from a message log file).

In example embodiments, results of the request message are correlated to results of the corresponding response message, thus forming a data pair. This correlation allows a viewer of the log file to quickly determine results associated with a web service call. The correlation also allows for errors to be easily reproduced in order to analyze the problem. Furthermore, the log files may be consolidated based on a test run (e.g., including several service calls for a single project). In one embodiment, the log files may be stored in a results folder in the database 204.

Each type of log file may be specific to a particular individual. For instance, a developer usually requires different information than a test coordinator or a project leader. The log module 210 may provide different output files specific to the needs of particular users. For example, a project leader may use the result log files to determine a number of executions, how many of the executions are successful, and how many of the executions are not successful. Alternatively, a service developer may rely on message log files that illustrate the results of the schema validation of each individual message (e.g., a request message or a response message) and thus give a more detailed analysis of the results. Each type of log files may be specific to a particular role, with role definition being implemented by the module that creates the log file. Roles can be, for example, a role of a developer, a role of a text coordinator, a role of a project leader, or the like.

In one embodiment, the log module 210 may incorporate results into a response message (hereinafter referred to as an "enhanced response message") that is sent back to the client system 104 once the validation process is performed on the response message. Thus, the enhanced response message may include, for example, a severity code (e.g., indicating seriousness or priority for resolution), validation time, result of the schema validation (e.g., success, failure, not performed), and an error message for validation failures (e.g., why the schema validation failed) for both the response message and its related request message, which is received by the proxy system before the response message was received. The validation time provides a time stamp that allows a user to easily find the request and response message (e.g., when the response message received by the client system 104 is analyzed by a user and the user needs to identify and locate a request or response message in the log files of the proxy system 102, the user can use this time stamp). It is noted that this enhanced response message may be used in synchronous embodiments.

As an example, assume a sales order is to be created in the server system 106 by a request message issued by the client system 104. This request message and the related response message, for example, contain a mandatory identifier for a related customer quote (e.g., in certain scenarios a sales order may be created based on a previously created quote which has been accepted by the customer, thus, the sales order contains a reference to a quote). The schema for this request message and the related response message may require that an identifier has a minimum length of one. However, for example, the system may allow from a logical perspective that in a certain scenario, a sales order can be created without a reference to a quote. In this case the client system 104, may not be able to assign a value to the mandatory identifier representing the reference to the quote in the request message. Therefore, this restriction of the schema on a syntactical level cannot be fulfilled on a business level because the root concept of the modelling is wrong. Instead, in this example, the customer quote identifier should be optional in the request and response message of the service to create a sales order. The schema validation indicates what is wrong with a message on the syntactical level allowing, for example, inferences on the semantic level. Other examples include messages which may be syntactically incorrect due to incorrect creations of a message in the client system 104. The error information is logged and, in addition, may be written into the response message to create an enhanced response message.

Figure 3:
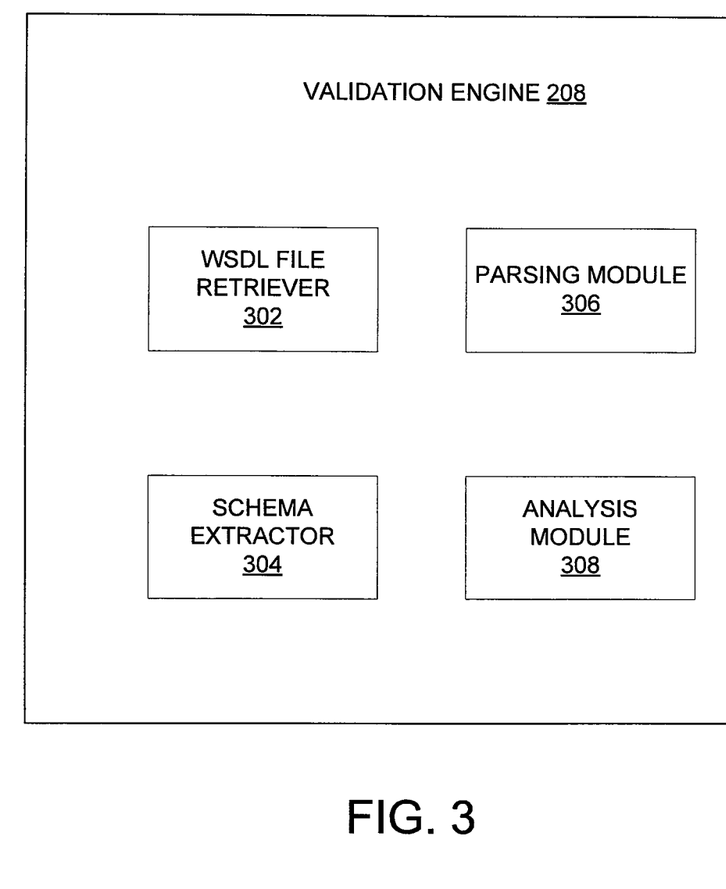
FIG. 3 is a block diagram of an example validation engine.

FIG. 3 is a block diagram of the example validation engine 208. The validation engine 208 performs the schema validation on received messages. As such, the validation engine 208 comprises a WSDL file retriever 302, a schema extractor 304, a parsing module 306, and an analysis module 308 communicatively coupled together. In one embodiment, the validation engine 308 performs the schema validation based mainly on JAVA libraries.

The WSDL file retriever 302 automatically retrieves the WSDL file when a request message is received by the proxy system 102. While a WSDL file is described, it is noted that any type of schema validation file containing schema information may be contemplated. In example embodiments, the WSDL file is retrieved based on a location indicated by the WSIL file of the server system 106. As a result, the WSDL file retriever 302 accesses the most current schema definition data every time a request message is received. In some cases, the WSDL file may be retrieved from a public library of WSDL files.

The schema extractor 304 extracts one or more schemas from the retrieved WSDL file. Because the WSDL file retrieved by the WSDL file retriever 302 is specified by the WSIL file, which is specific to the server system 106 the request message is sent to, the schema extractor 304 automatically extracts the right one or more schemas. The schema extractor 304 may further order the schemas.

The parsing module 306 parses the schemas and may put them in order, if required. Additionally, the parsing module 306 extracts the message body of the HTTP message and afterwards the SOAP body from the SOAP envelope. In example embodiments, the SOAP body represents message content, which is an XML message. The XML message may then be parsed by the parsing module 306.

The analysis module 308 checks whether a received message adheres to its one or more schemas. Thus, the analysis module 308 receives, as an input, the message content in the form of an XML message and the one or more XML schemas from the WSDL file and outputs an object containing the result of the validation as well as a validation time. The result may indicate success, failure, or that the validation could not be performed (e.g. due to unexpected technical issues). In some embodiments, a result error message (e.g., if the validation was not successful) may be generated by the analysis module 308.

Figure 4:
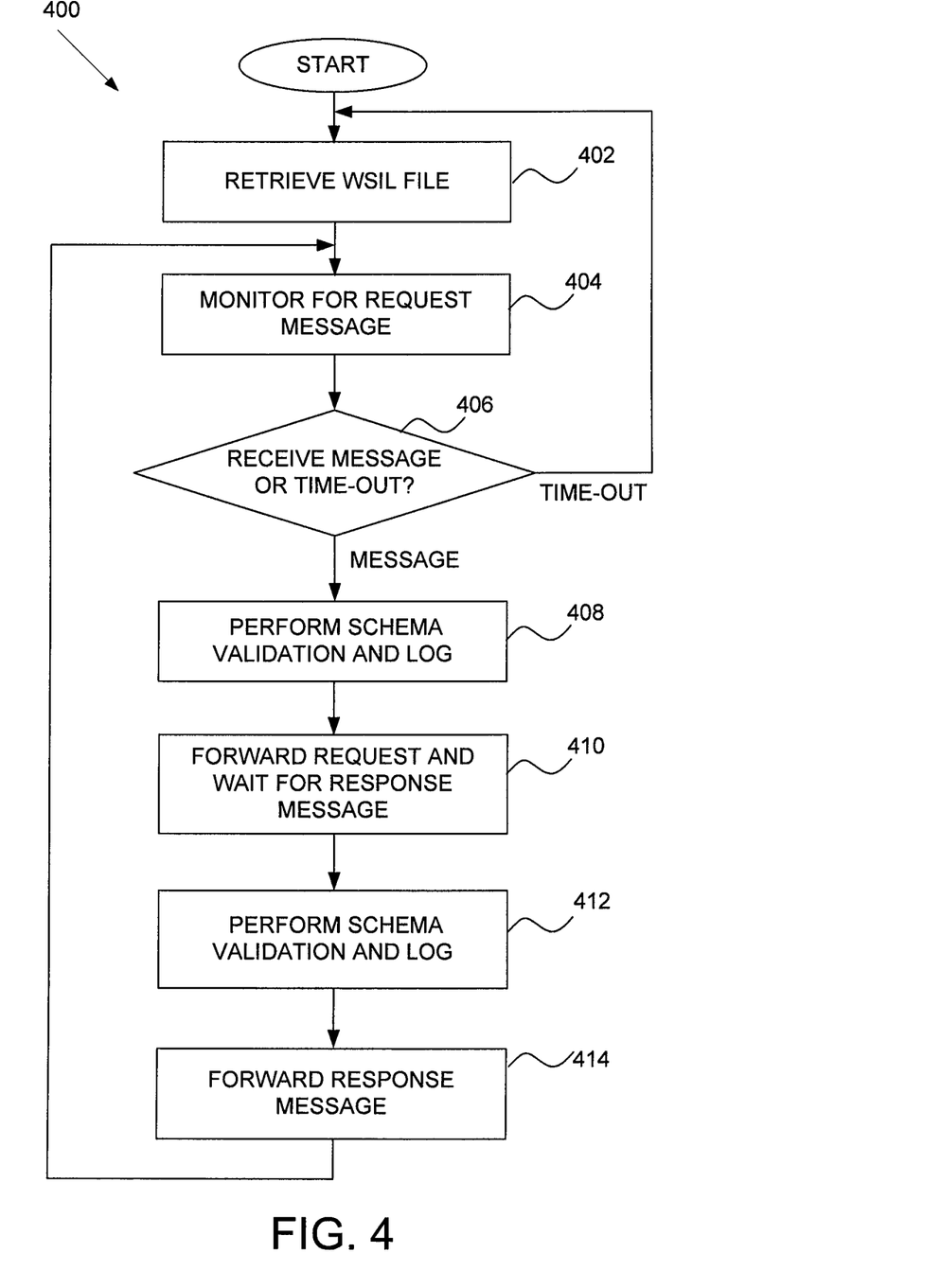
FIG. 4 is a flowchart of an example method to validate schema.

FIG. 4 is a flowchart of an example method 400 to validate a message according to its XML schema at the proxy system 102. Upon a start of a session, a WSIL file is retrieved in operation 402. In example embodiments, the configuration module 202 retrieves the WSIL file based on a configuration file locally stored (e.g., in database or file system 204). The configuration file indicates a location (e.g., a URI) from which to retrieve the WSIL file. The WSIL file indicates which services are provided by a server and which services may be consumed by a client.

In operation 404, the proxy system 102 monitors for a request message. In example embodiments, the monitoring module 206 enters a listening mode for the request message. It is noted that in some embodiments, if a request message is not received for a certain server system within a predetermined session time-out threshold in operation 406, the session related to this server system may reinitialize. The reinitialization (which may be performed once a request message is received again for a server system) will then trigger a download of the WSIL file again in operation 402.

When a request message (e.g., sales order create request) is received in operation 406, schema validation of the request message and generation of an associated log file is performed in operation 408. In example embodiments, the request message is a HTTP request message. Upon receipt of the HTTP request message, a check of technical criteria dependent on HTTP and SOAP may be performed by the proxy system 102 prior to the validation process. For example, if the request message is a POST request, the proxy system 102 (e.g., the monitoring module 206 or the validation engine 208) checks protocols used. Based on the protocol used (e.g., SOAP for standard synchronous services), the message content is extracted from the HTTP message body received with the POST request. The schema validation process may then be performed. The operation 408 will be discussed in more detail in connection with FIG. 5.

The request message is forwarded to the server system 106 in operation 410. In one embodiment, the request message is forward after the schema validation. In an alternative embodiment, the request message may be forwarded while the schema validation is being performed. The server system 106 processes the request (e.g., create a sales order) and returns a response message. The proxy system 102 waits for the response message in operation 410.

In operation 412, schema validation of the response message and updating of the corresponding log files is performed. The validation process of operation 412 will be discussed in more detail in connection with FIG. 6.

The response message from the server system 106 is forwarded to the client system 104 in operation 414. In one embodiment, the log module 210 may append information (e.g., the result of the schema validation, the validation time if it has been performed, and, in case the schema validation leads to errors, additional information about the error) to the response message, thereby resulting in an enhanced response message. Whether the response message is to be enhanced with additional information related to both the response message and the related request message is defined in the configuration file. While processing the request or the response messages or while waiting for a response message, the proxy system 102 is able to receive other request messages (as well as other response messages), also from other systems, and process them accordingly.

Figure 5:
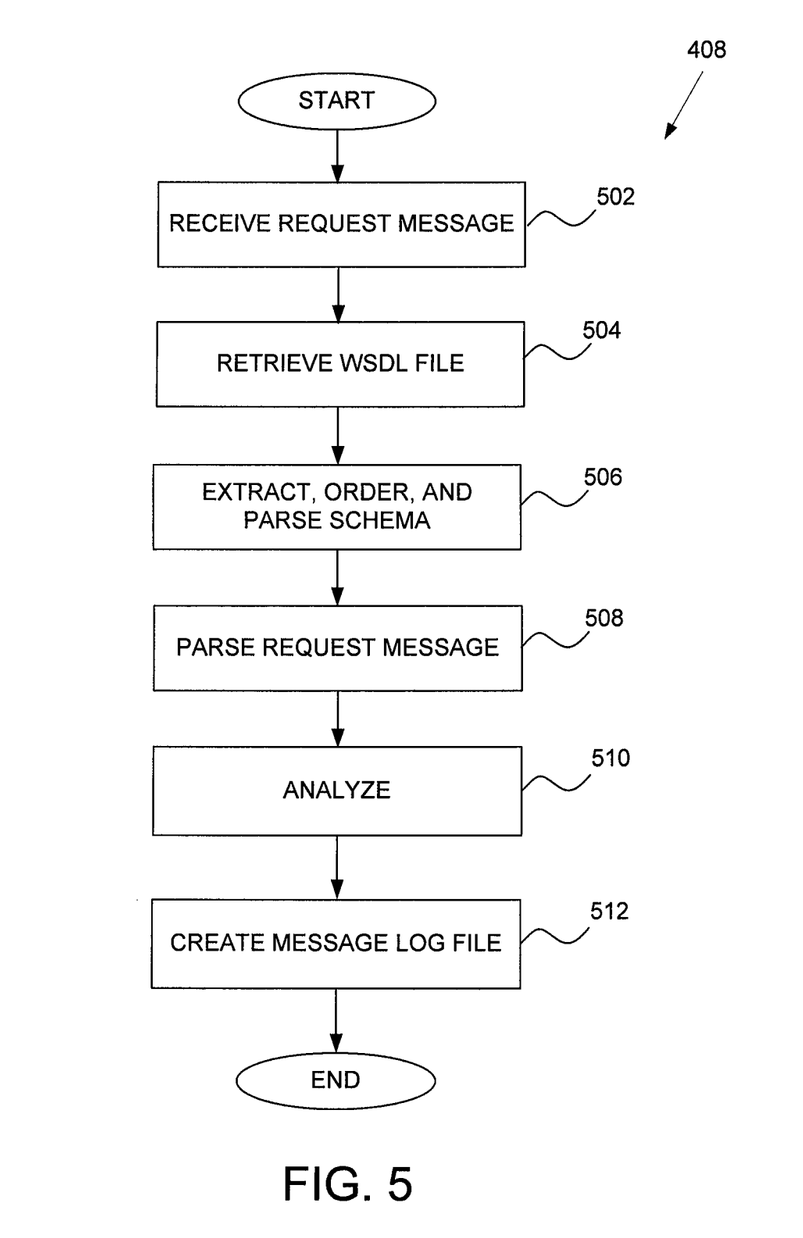
FIG. 5 is a flowchart of an example method to perform schema validation on a request message.

FIG. 5 is a flowchart of an example method (e.g., operation 408) to perform schema validation on the request message. In operation 502, the request message is received. Upon the receipt of the request message, the monitoring module 206 automatically triggers the retrieval of a WSDL file in operation 504. In example embodiments, the WSDL file retriever 302 automatically retrieves the WSDL file based on a location indicated by the retrieved WSIL file.

In operation 506, one or more schemas are extracted from the WSDL file by the schema extractor 304. The schemas may be ordered by the schema extractor 304 and parsed by the parsing module 306.

The request message is parsed in operation 508 by the parsing module 306. It is noted that the parsing of the request message can occur at any time after the request message is received. For example, the request message may be parsed before or concurrently with the retrieving of the WSDL file (operation 504) or the extracting, ordering, or parsing of the schemas (operation 506).

Analysis is performed in operation 510. In example embodiments, the analysis module 308 compares the request message to the one or more schemas to determine compliance of the request message to the one or more schemas.

Based on the analysis, one or more message log files are created in operation 512. In example embodiments, the log files may comprise several types of files, including a message log file that records results for each individual message, a result log file that provides a consolidated overview of a project (e.g., one or more related request messages), an all messages log file that records all messages, and a program log file which may be used for debugging. Each type of log file may be specific to a particular individual.

Figure 6:
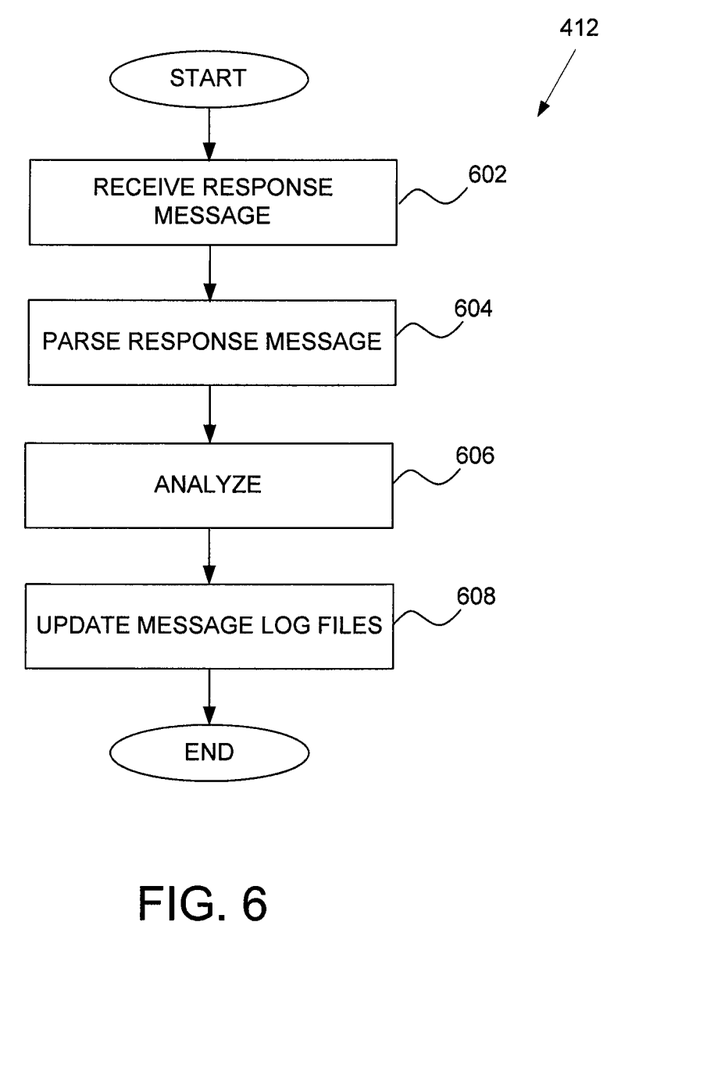
FIG. 6 is a flowchart of an example method to perform schema validation on a response message.

FIG. 6 is a flowchart of an example method (e.g., operation 412) to perform schema validation on the response message. In operation 602, the response message from the system under test 106 is received by the proxy system 102. Subsequently, the response message is parsed in operation 604.

Analysis of the response message is performed in operation 606. In one embodiment, the same schemas used to validate the corresponding request message are used to validate the response message. In an alternative embodiment, the proxy system 102 may retrieve a schema definition file upon receipt of the response message, thus performing operations similar to operations 504 and 506 of FIG. 5.

The message log files are updated in operation 608. In one embodiment, the log module 210 creates or updates log files with information regarding the result of the schema validation related to the response message and its related request message. In this way, the log files consolidate information for both the request message and the response message. Additionally, the log files may be consolidated by a test run (e.g., including several service calls for a project). The log files contain logs specific for certain roles of individuals. For example, the log files may be a result log file consolidating schema validation information for one session (e.g., recording information on how many messages and services were validated successfully, for how many messages and services a schema validation resulted in errors, and for how many messages and services a schema validation could not be performed, for example, due to unexpected technical issues). This log file may also list for which messages and services the schema validation was successful, not successful, or not performed. The log file may also be a message log file recording erroneous request and response messages (e.g., if the response message contains errors, the related request message will be logged, too) along with additional information about the error. An optional all messages log file may store all messages received by the proxy system 102, and a program log file may store information about the internal program flow of the proxy system 102. For example, a developer may be interested in the messages log file while a project leader may be interested in the result log file. In some embodiments, the log module 210 may also incorporate information (e.g., error information, validation issues) into the response message to create an enhanced response message that is sent back to the test system 104.

Modules, Components, and Logic

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 7:
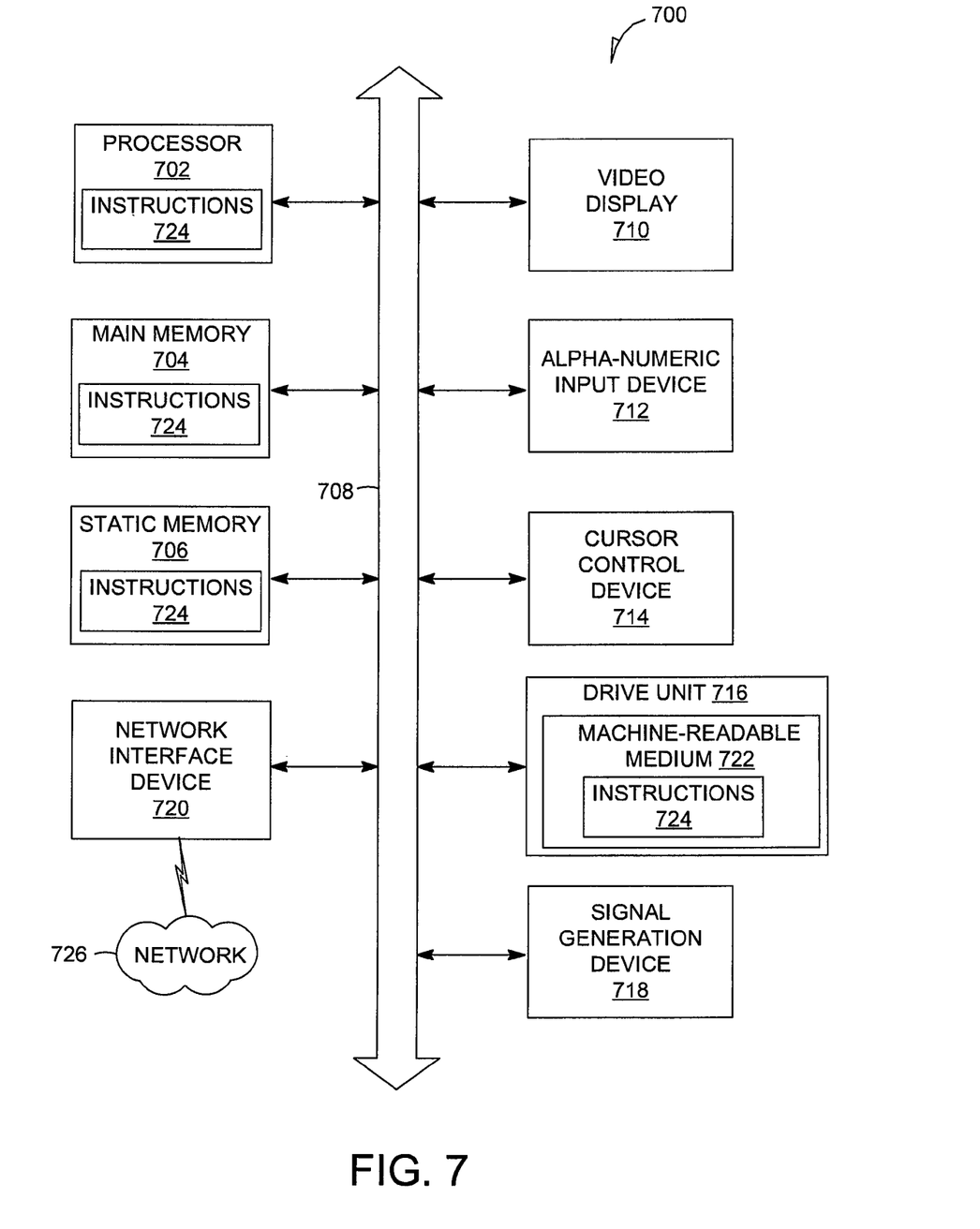
FIG. 7 is a simplified block diagram of a machine in an example form of a computing system within which a set of instructions for causing the machine to perform any one or more of the methodologies discussed herein may be executed.

With reference to FIG. 7, an example embodiment extends to a machine in the example form of a computer system 700 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, a server, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 may include a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). In example embodiments, the computer system 700 also includes one or more of an alphanumeric input device 712 (e.g., a keyboard), a user interface (UI) navigation device or cursor control device 714 (e.g., a mouse), a disk drive unit 716, a signal generation device 718 (e.g., a speaker), and a network interface device 720.

Machine-Readable Storage Medium

The disk drive unit 716 includes a machine-readable storage medium 722 on which is stored one or more sets of instructions 724 and data structures (e.g., software instructions) embodying or used by any one or more of the methodologies or functions described herein. The instructions 724 may also reside, completely or at least partially, within the main memory 704 or within the processor 702 during execution thereof by the computer system 700, the main memory 704 and the processor 702 also constituting machine-readable media. In example embodiments, the machine-readable storage medium 722 may comprise non-transitory machine-readable storage medium.

While the machine-readable storage medium 722 is shown in an exemplary embodiment to be a single medium, the term "machine-readable storage medium" may include a single storage medium or multiple media (e.g., a centralized or distributed database, or associated caches and servers) that store the one or more instructions. The term "machine-readable storage medium" shall also be taken to include any tangible medium that is capable of storing, encoding, or carrying instructions for execution by the machine and that causes the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 724 may further be transmitted or received over a communications network 726 using a transmission medium via the network interface device 720 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific exemplary embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As used herein, the term "or" may be construed in either an inclusive or exclusive sense. Additionally, although various example embodiments discussed focus on a specific network-based environment, the embodiments are given merely for clarity in disclosure. Thus, any type of electronic system, including various system architectures, may employ various embodiments of the search system described herein and is considered as being within a scope of example embodiments.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
receiving, at a proxy system, a request message from a client system representing a test system, the proxy system being hosted on a device separate from the client system;
validating, by the proxy system using one or more processors, the request message against one or more schemas from the schema definition file automatically retrieved in response to the receiving of the request message to determine request message schema validation results;
recording the request message schema validation results in at least one message log file,
forwarding the validated request message to a server system independent of whether the request message scheme validation results indicate a valid or invalid message;
receiving, by the proxy system, a response message from the server system, the response message corresponding to the validated request message;
validating, by the proxy system, the response message against the one or more schemas from the schema definition file automatically retrieved in response to at least one of the receiving of the request message or the receiving of the response message;
recording the response message schema validation results in the at least one message log file, the at least one message log file accessible during and after a test run including several service calls to provide an overview of the request message schema validation results and the response message schema validation results for the test run;
generating, at the proxy system, an enhanced response message comprising log information related to at least one of the request message schema validation results and the response message schema validation results appended to the response message from the server system; and
transmitting the enhanced response message to the client system.

2. The method of claim 1, further comprising automatically extracting the one or more schemas from the schema definition file automatically retrieved in response to the receiving of the request message.

3. The method of claim 1, further comprising:
correlating the results of the request message schema validation results and the response message schema validation result to form results of a data pair; and
creating one or more of the log message files to record the results of the data pair, the results of the data pair representing the results associated with a one of the web service calls.

4. The method of claim 1, further comprising retrieving the service discovery file upon startup of the session, the service discovery file indicating which services a server system provides and a location of a web service definition file indicating the schema definition file.

5. The method of claim 4, further comprising accessing one or more configuration files specific to the server system, each of the one or more configuration files indicating a location of the service discovery file.

6. The method of claim 1, further comprising monitoring for the request message, wherein a time out of a session occurs when the request message is not received after a predetermined time-out threshold.

7. The method of claim 6, further comprising retrieving a service discovery file upon reinitiating the session after the time out.

8. The method of claim 1, further comprising:
receiving further request messages and further response messages at the proxy system;
validating the further request messages and the further response messages in parallel with the validating of the request message and validating a response message, wherein the request message, the further request messages, the response message, and the further responses messages are included in the test run.

9. A proxy system comprising:
a processor;
a network interface device, coupled to the processor, to communicate with a network; and
a memory including instructions, when executed by the processor, cause the system to:
receive, at a proxy system, a request message from a client system representing a test system, the proxy system being hosted on a device separate from the client system;
validate, by the proxy system using one or more processors, the request message against one or more schemas from the schema definition file automatically retrieved in response to the receiving of the request message to determine request message schema validation results;
record the request message schema validation results in at least one message log file;
forward the validated request message to a server system independent of whether the request message scheme validation results indicate a valid or invalid message;
receive, by the proxy system, a response message from the server system, the response message corresponding to the validated request message;
validate, by the proxy system, the response message against the one or more schemas from the schema definition file automatically retrieved in response to the receiving of the request message or the receiving of the response message;
record the response message schema validation results in the at least one message log file, the at least one message log file accessible during and after a test run including several service calls to provide an overview of the request message schema validation results and the response message schema validation results for the test run;
generate, at the proxy system, an enhanced response message comprising log information related to at least one of the request message schema validation results and the response message schema validation results appended to the response message from the server system; and
transmit the enhanced response message to the client system.

10. The system of claim 9, wherein the memory including instructions, when executed by the processor, cause the system to retrieve a service discovery file, the service discovery file indicating which services a server system provides and a location of a web service definition file indicating the schema definition file.

11. The system of claim 10, wherein the memory including instructions, when executed by the processor, cause the system to access one or more configuration files specific to the server system, each of the one or more configurations file indicating a location of the service discovery file.

12. The system of claim 10, wherein the location of the web service definition file and the location of the one or more schema definition files is a URI.

13. A non-transitory machine-readable storage medium in communication with at least one processor, the machine-readable storage medium storing instructions which, when executed by the at least one processor, performs operations comprising:
   receiving, at a proxy system, a request message from a client system, the proxy system being hosted on a device separate from the client system;
   validating, by the proxy system, the request message against one or more schemas from the schema definition file automatically retrieved in response to the receiving of the request message to determine request message schema validation results;
   recording the request message schema validation results in at least one message log file,
   forwarding the validated request message to a server system independent of whether the request message scheme validation results indicate a valid or invalid message;
   receiving, by the proxy system, a response message from the server system, the response message corresponding to the validated request message;
   validating, by the proxy system, the response message against the one or more schemas from the schema definition file automatically retrieved in response to the receiving of the request message or the receiving of the response message;
   recording the response message schema validation results in the at least one message log file, the at least one message log file accessible during and after a test run including several service calls to provide an overview of the request message schema validation results and the response message schema validation results for the test run;
   generating, at the proxy system, an enhanced response message comprising log information related to at least one of the request message schema validation results and the response message schema validation results appended to the response message from the server system; and
   transmitting the enhanced response message to the client system.

14. The method of claim 1, further comprising:
   creating a consolidated log file that provides an overview of results during the test run, the consolidated log file including the at least one message log file; and
   accessing the consolidated log file to determine at least one of how many errors exist in the test run, where the errors occurred, and which services are affected by the errors.

15. The method of claim 3, wherein the results of the data pair includes a validation time of the request message, a validation time of the response message, or schema validation errors.

16. The system of claim 9, wherein the request message schema validation results indicates whether or not the request message is syntactically correct, and the response message schema validation results indicates whether or not the response message is syntactically correct.

17. The system of claim 9, wherein the results of the data pair includes a validation time of the request message, a validation time of the response message, or schema validation errors.

18. The method of claim 1, wherein log information related to at least one of the request message schema validation results and the response message schema validation results includes at least one of a severity code indicating seriousness or priority for resolution, validation time, a successful schema validation, a failed schema validation, an indication that schema validation has not been performed, and an error message for the failed schema validation.

* * * * *